(12) United States Patent
McKay et al.

(10) Patent No.: US 7,191,061 B2
(45) Date of Patent: Mar. 13, 2007

(54) AUTO-STEERING APPARATUS AND METHOD

(75) Inventors: Mark D. McKay, Idaho Falls, ID (US); Matthew O. Anderson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 603 days.

(21) Appl. No.: 10/418,667

(22) Filed: Apr. 17, 2003

(65) Prior Publication Data

US 2004/0210357 A1 Oct. 21, 2004

(51) Int. Cl.
*G01C 21/00* (2006.01)

(52) U.S. Cl. .................. 701/213; 701/23; 701/50; 701/207

(58) Field of Classification Search ............... 701/213, 701/207, 23, 41, 50; 318/857; G01C 21/00; G01F 00/00, G01F 19/00
See application file for complete search history.

(56) References Cited

U.S. PATENT DOCUMENTS

| | | | | |
|---|---|---|---|---|
| 2,340,100 A | * | 1/1944 | Ardnt | 172/793 |
| 2,600,016 A | * | 6/1952 | Titus | 280/468 |
| 3,250,340 A | * | 5/1966 | Roberson | 180/242 |
| 3,983,833 A | * | 10/1976 | Eickmann | 440/5 |
| 4,215,759 A | * | 8/1980 | Diaz | 180/168 |
| 4,470,475 A | * | 9/1984 | Carlson | 180/6.48 |
| 5,438,517 A | * | 8/1995 | Sennott et al. | 701/213 |
| 5,548,516 A | * | 8/1996 | Gudat et al. | 701/200 |
| 5,610,815 A | * | 3/1997 | Gudat et al. | 701/23 |
| 5,615,116 A | * | 3/1997 | Gudat et al. | 701/23 |
| 5,629,855 A | * | 5/1997 | Kyrtsos et al. | 701/300 |
| 5,956,250 A | * | 9/1999 | Gudat et al. | 701/23 |
| 5,984,430 A | * | 11/1999 | Koga et al. | 303/116.1 |
| 6,258,008 B1 | * | 7/2001 | Tabata et al. | 477/107 |
| 6,276,136 B1 | * | 8/2001 | Oishi et al. | 60/547.1 |
| 6,539,303 B2 | * | 3/2003 | McClure et al. | 701/213 |
| 6,568,493 B2 | * | 5/2003 | Parkert et al. | 180/53.1 |
| 6,656,074 B2 | * | 12/2003 | Andriani | 475/28 |
| 6,697,229 B2 | * | 2/2004 | Tamura et al. | 360/261.3 |
| 6,711,501 B2 | * | 3/2004 | McClure et al. | 701/213 |
| 2002/0043409 A1 | * | 4/2002 | Parkert et al. | 180/53.4 |
| 2002/0166676 A1 | * | 11/2002 | Andriani | 172/2 |

(Continued)

FOREIGN PATENT DOCUMENTS

WO WO 2004095198 A2 * 11/2004

OTHER PUBLICATIONS

Trimble description for AgGPS FlightBar—DGPS parallel swth guidance for aircraft, unknown date.*

(Continued)

*Primary Examiner*—Cuong Nguyen
(74) *Attorney, Agent, or Firm*—Wells St. John P.S.

(57) ABSTRACT

A vehicular guidance method involves providing a user interface using which data can be input to establish a contour for a vehicle to follow, the user interface further configured to receive information from a differential global positioning system (DGPS), determining cross track and offset data using information received from the DGPS, generating control values, using at least vehicular kinematics, the cross track, and the offset data, and providing an output to control steering of the vehicle, using the control values, in a direction to follow the established contour while attempting to minimize the cross track and the offset data.

22 Claims, 8 Drawing Sheets

U.S. PATENT DOCUMENTS

2003/0187577 A1* 10/2003 McClure et al. ............ 701/213
2004/0210357 A1* 10/2004 McKay et al. ................ 701/23
2005/0171693 A1*  8/2005 Lange et al. ................ 701/209

OTHER PUBLICATIONS

Trimble's AgGPS Parallel Swathing Option—Operation Manual, Firmware Ver. 1.40, 1.41, and 1.42, Rev. E, Sep. 2000.*

Trimble Navigation Limited, AgGPS(R) 70 RDL—Operation Manual, Apr. 2000.*

Unknown, Spraying problems, nevermore, Mar. 15, 2001, from http://apply-mag.com/mag/farming_spraying_problems_nevermore/.*

* cited by examiner

FIG. 1

AUTO-STEERING APPARATUS AND METHOD

GOVERNMENT RIGHTS

This invention was made with Government support under Contract No. DE-AC07-99ID13727 awarded by the U.S. Department of Energy to Bechtel BWXT Idaho, LLC, and the Government has certain rights in this invention.

TECHNICAL FIELD

The invention generally relates to robotics. More particularly, it relates to automated steering apparatus and methodologies for vehicles, such as farm vehicles and other vehicles.

BACKGROUND OF THE INVENTION

Robots are used to cost-effectively perform complex, hazardous, and repetitive tasks not preferred by humans. Robots play an important role in reducing cost, improving worker health and safety, augmenting product quality, and increasing overall productivity. In agriculture, the opportunities for robot-enhanced productivity are immense—and the robots are appearing on farms in various guises and in increasing numbers. Precision agriculture calls for highly developed systems to perform traditional farming tasks. Current systems provide an operator with assisted navigation via a satellite position signal. This assistance is accomplished using a device such as a lightbar to indicate a direction the operator should drive to maintain a straight line to travel.

The lightbar includes a row of lights or light emitting diodes (LEDs) which interface to a GPS receiver to provide parallel swath guidance. The lightbar consisting of a row of LEDs denotes the vehicle's deviation to the left or right of the swath by respectively illuminating a proportional number of LEDs to the left or right of a central on-course LED. The lightbar's internal guidance computer receives the serial GPS position data and displays a steering indicator to indicate whether or not the vehicle is close to an imaginary A-B line the driver is attempting to drive down, thereby allowing the driver to determine correct steering adjustments. One such lightbar system is model number Starlink LB-3 sold by Starlink Inc., Austin, Tex.

The transfer of global positioning system (GPS) technologies to civilian industry has greatly assisted in meeting the challenges presented by today's precision agricultural needs. Using GPS systems, accurate and highly reliable satellite-based positioning information, which typically achieves less than one meter accuracy by utilizing differential GPS position corrections transmitted from fixed base stations, is provided to operators, for example though moving map displays. Such information allows for precise navigation and guidance. Systems utilizing GPS technology have been used in the past to assist in the aerial and terrestrial application of fertilizers, herbicides and pesticides, etc. However, such systems have generally been limited in their capabilities.

Current navigation systems fail to have an ability to automatically control the vehicle with equipment mounted thereon. During peak operations, the operator may be required to oversee a plurality of tasks including operating the vehicle. Assisted steering systems were used in the past to relieve an operator from driving related tasks. The capability to perform parallel contour swathing while minimizing "skip", and "overlap" is preferred for cost-effective crop management within precision agriculture. The complexity of operating heavy equipment coupled with other tasks including steering the vehicle to a light bar indicator may be overwhelming to an operator. In a known navigation system, heading correction data is used to guide to, or maintain a vehicle on, a predetermined course.

It is difficult to approximate human steering. For example, a human will sometimes turn a steering wheel rapidly and sometimes slowly for the same turn depending on vehicle kinematics, such as speed.

It would be desirable to retrofit an automatic steering system to an existing vehicle without the need to tap in to or modify the vehicle's hydraulic systems.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In one aspect, a vehicular guidance method involves providing a user interface using which data can be input to establish a contour for a vehicle to follow, the user interface further configured to receive information from a differential global positioning system (GPS), determining cross track and offset data using information from the DGPS, generating control values, using at least vehicular kinematics, the cross track and the offset data, and providing an output to control steering of the vehicle, using the control values, in a direction to follow the established contour while attempting to minimize the cross track and the offset data.

In another aspect, a vehicular guidance system configured to removably attach to a vehicle is described. The vehicular guidance system includes a user interface configured to establish a contour for a vehicle to follow. The user interface is further configured to receive information from a differential global positioning system (DGPS), a computer system configured to receive input from the user interface to generate cross track and offset data. The vehicular guidance system also includes a master controller configured to generate control values, using at least the cross track and the offset data, in order to control the vehicle to follow the established contour, a second controller configured to interface with the master controller and a steering control system. The second controller is configured to receive commands from the master controller to control the steering control system in order to control steering of the vehicle to follow the established contour while attempting to minimize the cross track and the offset data.

In a further aspect, the present invention provides a vehicle guidance system having a computer system having a user interface, the computer system configured to receive data from a differential global positioning system (DGPS) and reference vehicular contour information from a user. The computer system is further configured to generate cross track and offset data. The vehicle guidance system also includes a control system configured to removably attach to a vehicle, the control system configured to receive at least vehicular velocity, the cross track and the offset data to generate commands issued to a steering control system to control steering of the vehicle, to follow the reference vehicular contour.

Figure 1:
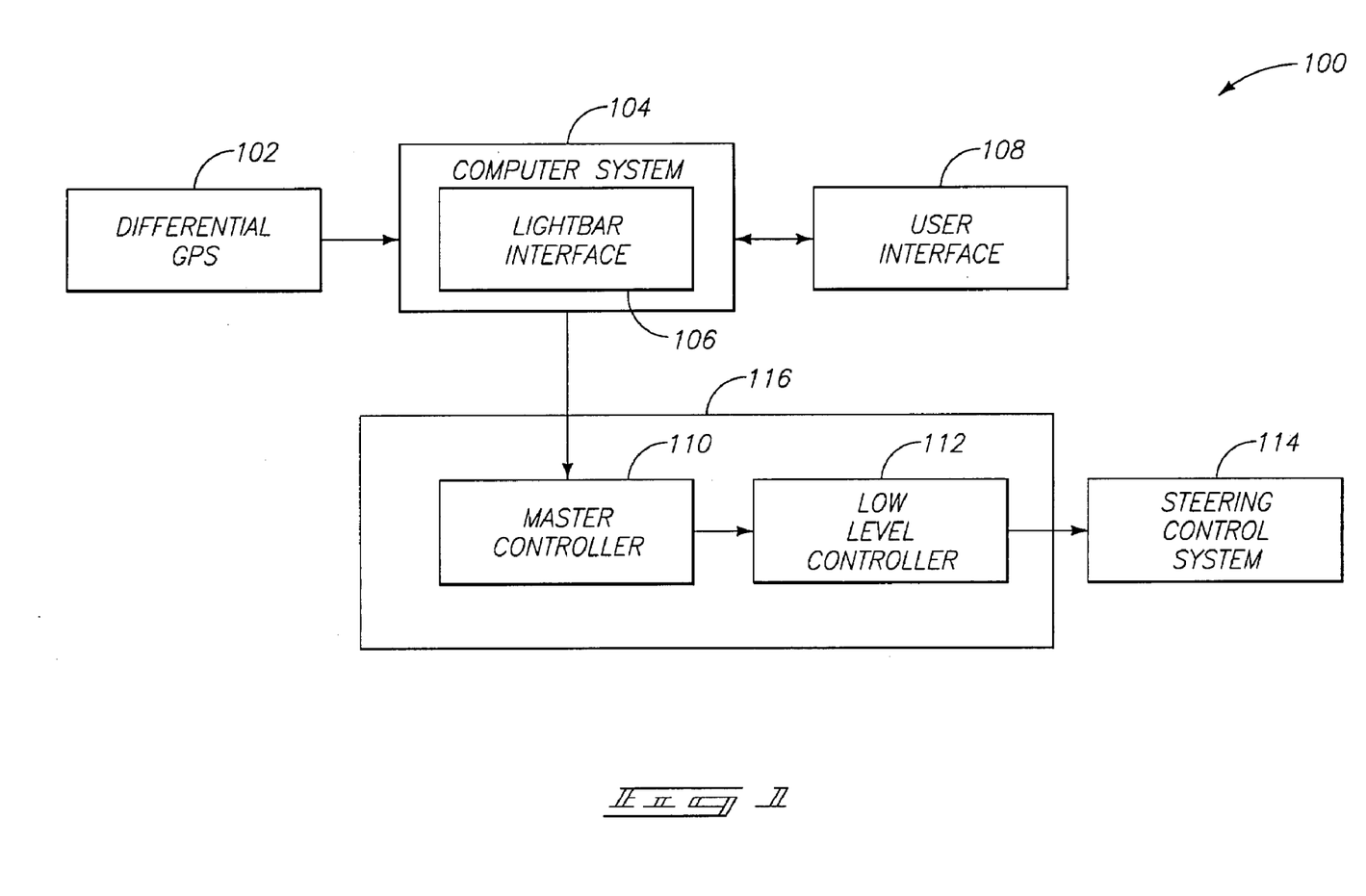
FIG. 1 is a schematic of an auto-steering system.
Figure 3A:
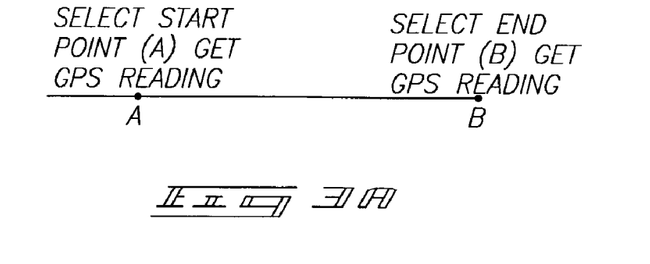
FIG. 3A shows an exemplary approach for establishing an A-B line used as a reference for performing parallel swathing in one embodiment.

FIG. 1 shows a high-level schematic of an auto-steering system 100 in accordance with one embodiment of the present invention. In one embodiment, the steering system is used in a vehicle for parallel contour swathing. The auto-steering system 100 includes a differential Global Positioning System (DGPS) 102, a computer system 104 having one or more application programs, configured to perform light-bar functions, loaded in the computer system. The one or more application programs are further configured to display an interface 106 (hereinafter "lightbar interface") to a user on a display device. The system 100 includes a user interface 108 that enables the user to setup parameters. For example, such parameters include parameters for establishing a distance for a vehicle to travel, between starting and ending points. Further details of establishing starting and ending points (A-B line) will be described below in connection with FIG. 3. The auto-steering system 100 is adaptable and may be retrofitted to various vehicles.

As is well known, differential GPS (DGPS) functions by observing the difference between pseudo range measurements determined from the received GPS signals with the actual range as determined from the known reference station point. The DGPS reference station determines systematic range corrections for all the satellites in view based upon the observed differences. The systematic corrections are subsequently broadcast to interested users having appropriate DGPS receivers. The corrections enable the user to increase the accuracy of their GPS determined position. DGPS systems are much less expensive than real-time kinematic DGPS systems. The inventors have determined that DGPS provides sufficient accuracy for various applications including farming applications. Using DGPS strikes a good balance between cost and accuracy.

Figure 5:
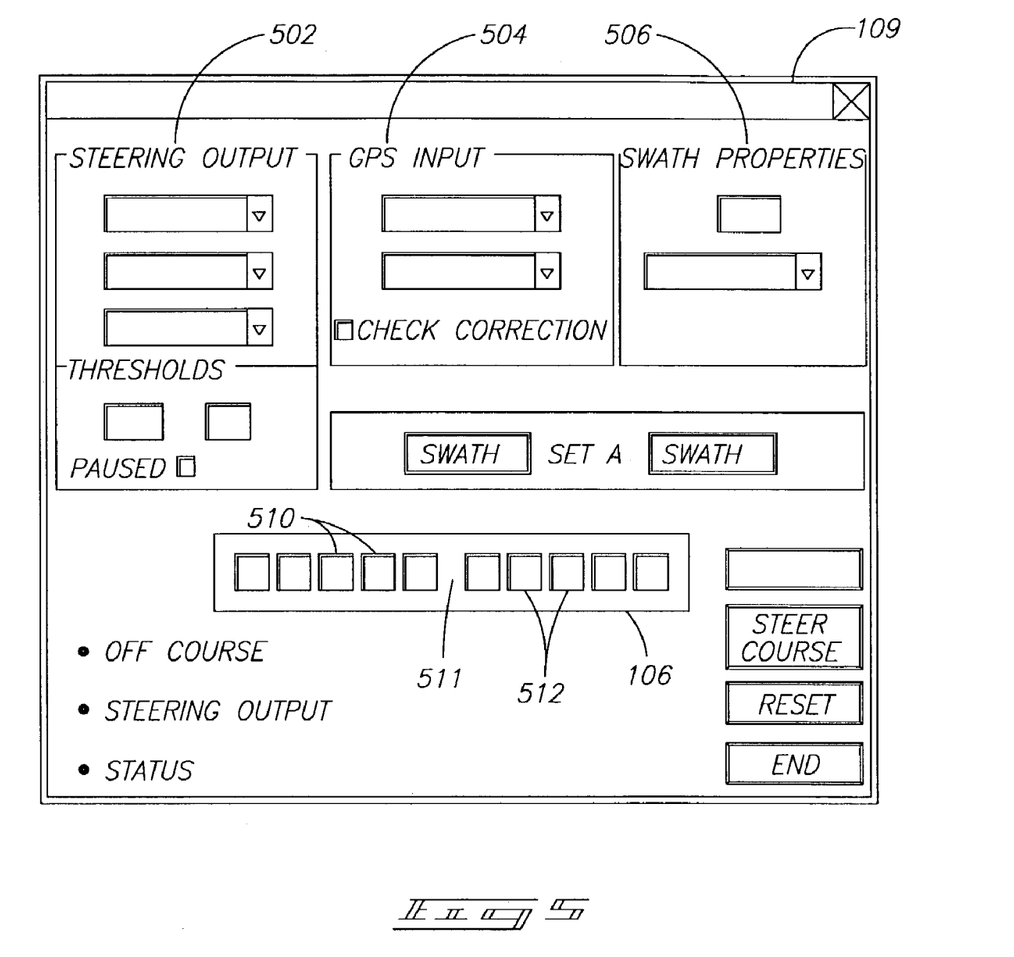
FIG. 5 shows a screen shot of an interface illustrated in FIG. 1 in accordance with some embodiments.

The lightbar interface 106 is configured to accept input data from the DGPS 102 and also from the user interface 108. In one embodiment, the lightbar interface 106 and the user interface 108 may be configured as an integrated interface 109, in a common housing. Alternatively, they may be configured as distinct interface units. In one embodiment, such an integrated interface 109 is shown in FIG. 5. Exemplary input data from the user interface 108 may include the A-B line data described at FIG. 3. The DGPS 102 functions by determining a present position, ground track, and ground speed of a vehicle on which system 100 is installed. The DGPS 102 also receives heading information from a magnetic compass (not shown). The heading information may also be calculated from vehicle position history. The lightbar interface 106 receives such information from the DGPS 102 together with information from the user interface 108 and computes deviations from the desired ground track or A-B line. The deviations include heading error (hereinafter "cross track") and distance from a predetermined A-B line (hereinafter "offset") values.

The system 100 further includes a master controller 110 that, in operation, receives the cross track and offset values as well as vehicle kinematics information such as, for example, vehicular velocity, and computes control values for correcting cross track and offset errors. The system 100 further includes a low-level controller 112 that, in operation, receives the control values generated by the master controller 110 and issues commands. The system 100 further includes a steering control system 114 coupled to the controller 112. The controller 112 issues commands to the steering control system 114 to steer the vehicle along the predetermined track/contour while overcoming the cross track and offset errors. In one embodiment, the master controller 110 and the low-level controller 112 may be implemented as software, hardware, or firmware. It will be appreciated that the master controller and the low-level controller may also be implemented, for example, in a programmable logic device, or an application specific integrated circuit.

In one embodiment, the low-level controller 112 upon sensing a counteracting force on the steering control system 114 applied by the user, exceeding a predetermined threshold, disables automatic steering, thereby enabling the user to manually steer the vehicle. The master controller and the low-level controller are together depicted as control system 116 in FIG. 1 and alternatively referred as such.

Figure 2:
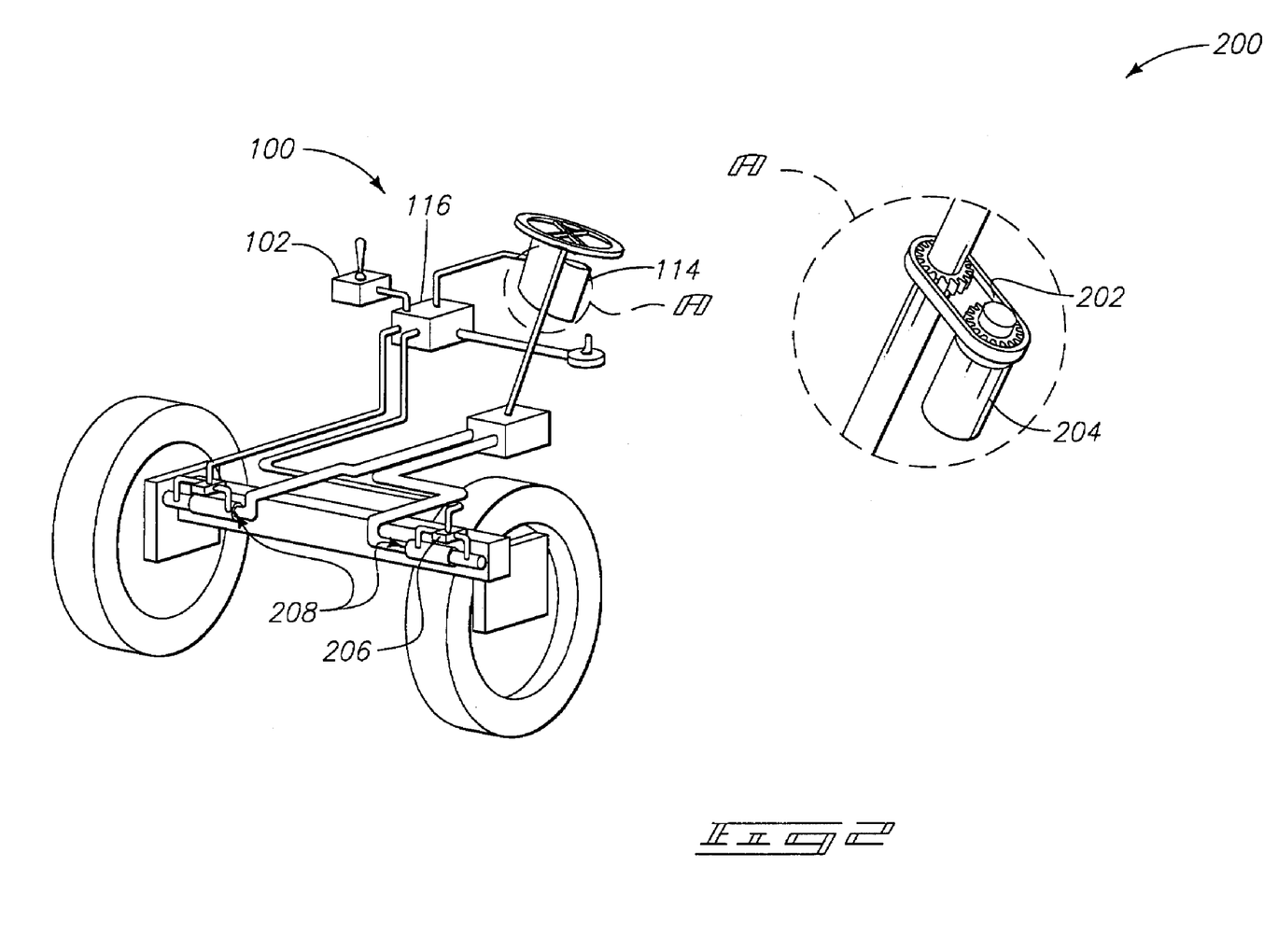
FIG. 2 is a schematic of a vehicle with the auto-steering system shown in FIG. 1.

FIG. 2 illustrates a schematic of a vehicle 200 with the auto-steering system 100 shown in FIG. 1 installed on the vehicle. Also shown in FIG. 2 are various components of the auto-steering system 100 along with various subsystems of the vehicle. For example, as described above with respect to FIG. 1, the control system 116, having a master controller 110 and low-level controller 112, interfaces with and issues steering commands to the steering control system 114. Steering actuators 208 appropriately steer the vehicle 200 upon receiving further commands from the steering control system 114. The control system 116 also receives information from steering sensors 206 for fine tuning steering of the vehicle 200. The control system 116 may be retrofit to the vehicle 200 to accomplish auto-steering tasks without tapping into or disturbing hydraulic steering components of the vehicle.

The steering control system 114 includes a drive motor assembly having a timing belt 202, and a drive motor 204, for controlling steering of the vehicle. Steering actuators 208 steer the vehicle in a desired direction of travel. In one embodiment, the drive motor is a D.C. motor biased to steer the vehicle in a manner that approximates a human response. As described above, upon sensing a counteracting force produced by a user by way of manually holding the steering, the controller 116 disables auto-steering action, thereby enabling the user to manually control steering of the vehicle.

In one embodiment, the master controller 110 computes the control values in accordance with the following equations:

Vehicular velocity is determined from the DGPS 102;

Vehicular turn=$R_k$*((cross track−$RG_1$)−(offset*$RG_2$))/velocity, where $R_k$, $RG_1$, and $RG_2$ are gains based upon velocity, cross track, and offset.

Turn desired=vehicular turn*Axle_AD+Axle_mid, where

Axle_AD is a conversion constant;
Axle_mid is a calibrated value where the vehicle drives straight;
Axle_POT is a read axle position;
Current is a current read from the D.C. motor
Motor output is Gain * (turn desired−Axle_POT)

Referring to FIG. 3A, there is shown an exemplary approach for establishing an A-B line used as a reference for performing parallel swathing. Upon retrofitting the auto-steering system 100 to a vehicle, the user selects an arbitrary location in a field as a starting point A for which a GPS reading is obtained and logged in the computer system 104 (FIG. 1). As the user drives to the end of the field or some other predetermined location (endpoint B), GPS reading is obtained and logged for such location. An A-B line is thus established and the auto-steering system 100 steers a vehicle in a straight line with the A-B line as a reference.

Figure 3B:
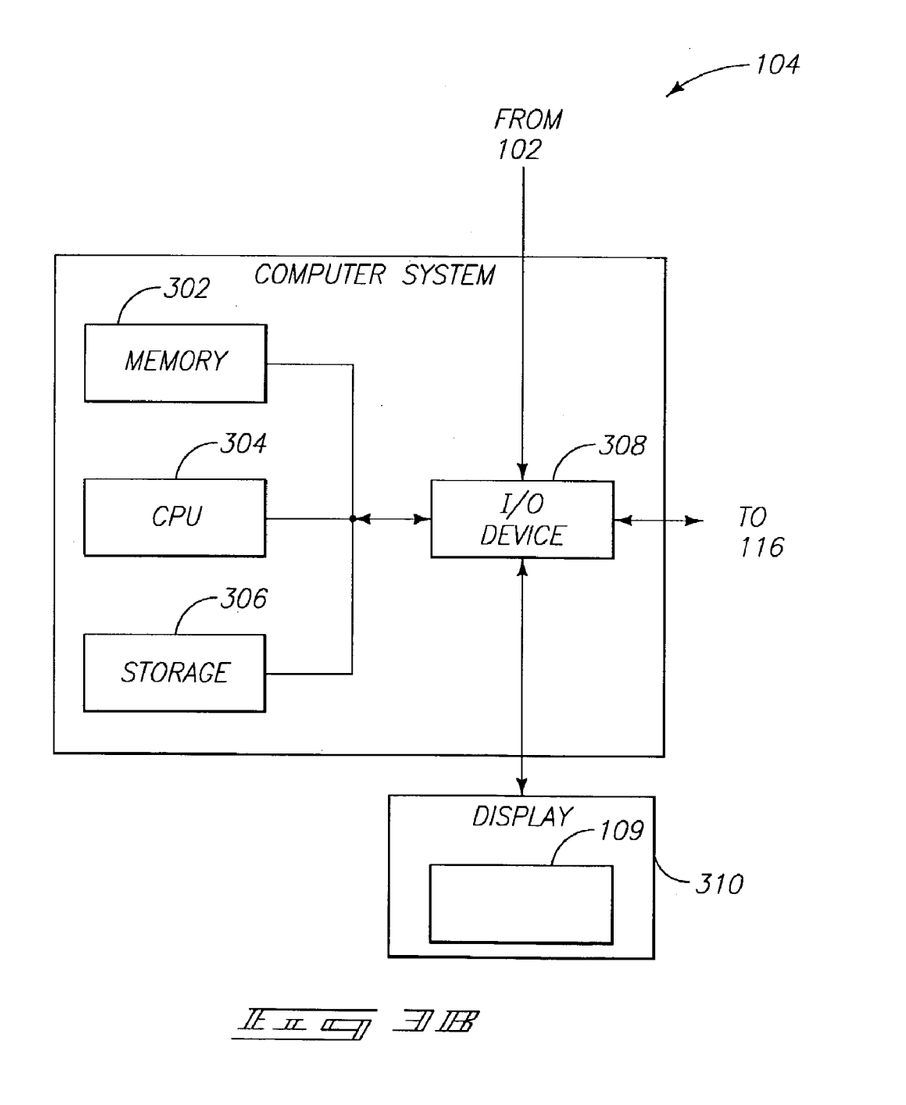
FIG. 3B shows exemplary details of a computer system shown in FIG. 1 in accordance with some embodiments.

FIG. 3B shows a detailed diagram of a computer system in accordance with one embodiment of the present invention shown in FIG. 1. The computer system 104 is loaded with software that interacts with other components of auto-steering system 100 via a variety of communication protocols. In one embodiment, the control system 116 may be implemented as a software application loaded in the computer system 104. In another embodiment, the control system 116 may be implemented in another computer independent of the computer system 104. Although a variety of computer systems can be used with the present invention, an exemplary general purpose computer is shown in FIG. 3B.

With reference still to FIG. 3B, computer system 104 includes a memory 302, one or more processors (CPUs) 304 for processing information, a storage device 306 for storing information therein, an input/output (I/O) device 308 configured to interact with the DGPS system 102 and a display device 310 for displaying information. The display device 310 is configured to display an interface 109 for enabling a user to input information into computer system 104.

Figure 4:
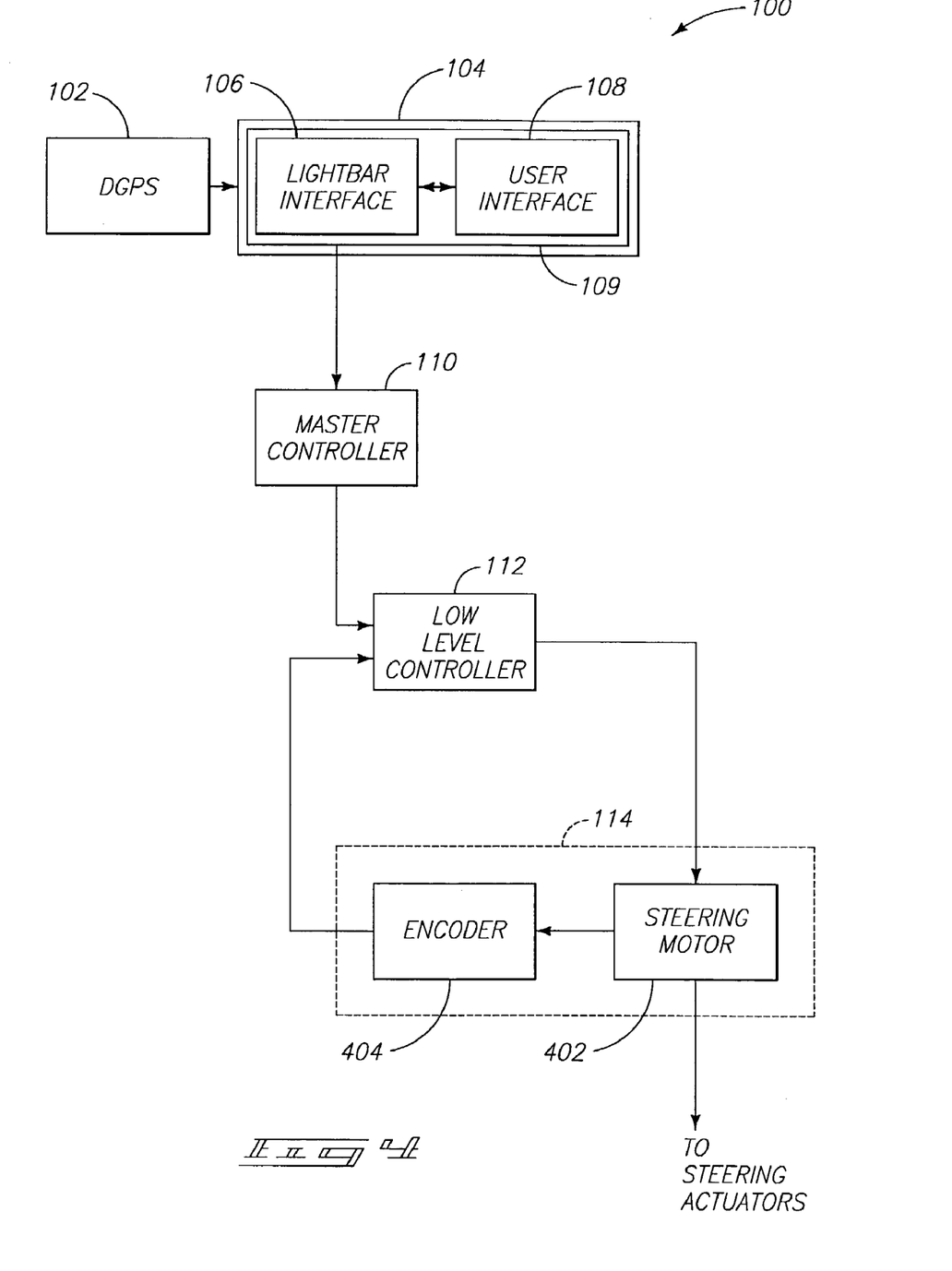
FIG. 4 shows a schematic of an auto-steering system in accordance with alternate embodiments.

FIG. 4 shows a detailed schematic of the auto-steering system shown in FIG. 1 disclosing exemplary details of the steering control system 114 with a feedback used in a closed-loop control system. In one embodiment, the steering control system 114 includes a steering motor 402 and an encoder 404. The steering motor 402, in operation, receives control commands from the low-level controller 112 to steer the vehicle in a desired travel direction on which system 100 is installed. The low-level controller 112, in operation, monitors steering of the vehicle via a feedback loop, using the encoder 404, and issues commands to the steering motor 402 to attempt to minimize steering errors.

Referring to FIG. 5, there is shown a screen shot of the interface 109 which includes the lightbar interface 106 and the user interface 108 illustrated in FIG. 1. Interface 109 includes various menus displaying, for example, swath properties 506 for establishing a reference A-B line—as described in detail in connection with FIG. 3. Interface 109 is further configured to receive GPS input from the DGPS 102 and to compute cross track and offset errors as explained at FIG. 1. Lightbar interface 106 illustrated in FIG. 5 may be comparable to a physical lightbar device of the type having a plurality of light emitting diodes. As a vehicle with system 100 installed thereon is driven to follow a predesignated contour, any deviations from the predesignated contour are displayed by highlighting, changing the color of, or illuminating a proportional number of boxes within interface 106. For example, if the vehicle deviates to the left of the predesignated contour, such deviation would be represented by highlighting or displaying a tick mark in box 510 displayed to the left of a center point 511. Likewise, if the vehicle deviates to the right, such deviation would be displayed in box 512.

Real-time kinematic (RTK) is an even more accurate technique for improving the accuracy of GPS receivers. As is well known, RTK involves the use of two or more GPS receivers which are coupled via a communication link. The GPS receivers are spatially separated and communicate to resolve ambiguities in the carrier phase of the GPS signals transmitted from the GPS satellites. The resulting carrier phase information is used to determine an extremely precise position (e.g., within 2 to 3 centimeters). Thus, RTK DGPS receivers are among the most accurate navigation and surveying instruments available.

Figure 6:
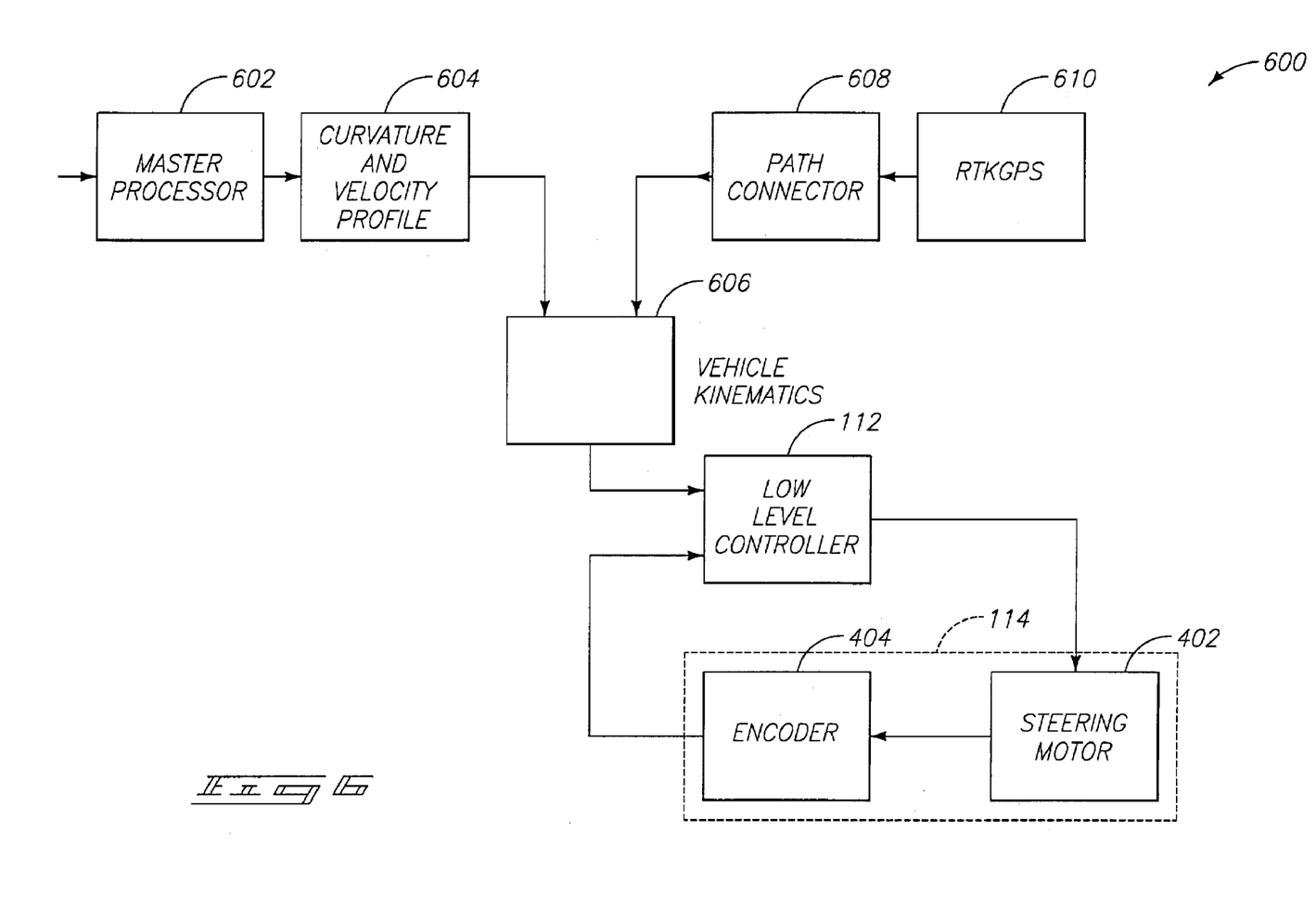
FIG. 6 is a block diagram of an auto-steering system for performing parallel contour swathing in accordance with alternative embodiments.

FIG. 6 shows another embodiment of the auto-steering system for performing parallel contour swathing. The auto-steering system 600 includes a master processor 602 which receives and processes command waypoints received from a user. Curvature and velocity profiles for a vehicle (not shown) installed with the auto-steering system 600 are programmed in device 604. Real time kinematic (RTK) DGPS system 610 determines the position and location information of the vehicle. Device 608 issues commands to correct vehicular path if the vehicle deviates from a predesignated path of travel. Correction commands from the device 608, curvature and velocity profile information from the device 604 are received in device 606, which together with vehicle kinematics information, generates steering commands to a low-level controller 112 to control the steering control system 114. For example, device 606 provides gain tuning based upon the specific vehicle kinematics associated with each implementation. The system illustrated in FIG. 1 can include either DGPS, or the more accurate, yet more complex and more expensive, RTK GPS receivers.

Figure 7:
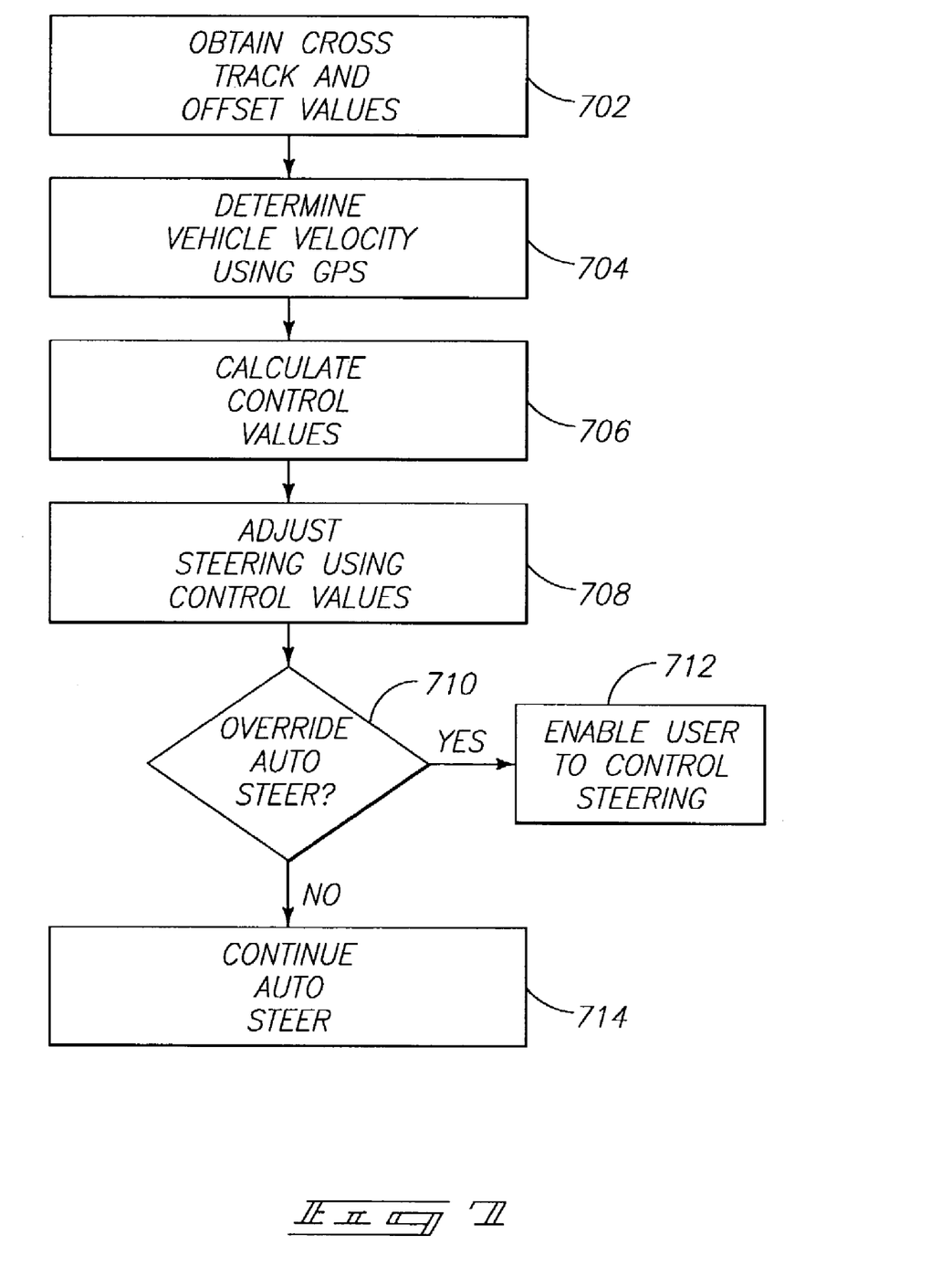
FIG. 7 is a high level flow chart illustrating the steps involved in automatically performing parallel contour swathing in one embodiment.

FIG. 7 shows a high level flow chart illustrating the steps involved in automatically performing parallel contour swathing in one embodiment of the present invention. Initially, at a step 702, cross track and offset information is obtained using a lightbar interface 106, user interface 108 and DGPS 102.

At a step 704, vehicular velocity is computed using the DGPS. Based on the vehicular velocity, cross track and offset information, control values to correct cross track and offset errors are determined in a master controller 110 at a step 706.

At a step 708, steering control system 114 is adjusted to automatically steer the vehicle, along a predetermined vehicular contour, the steering control system receiving commands from the low-level controller 112 which in turn receives commands from the master controller 110.

At a step 710, an inquiry is made to determine if the auto-steering function is to be disabled. If the low-level controller 112 senses a counteracting force applied by a user to take manual control to steer the vehicle, then the controller 112 issues commands to the steering control system 114 to disable auto-steering of the vehicle, thereby enabling the user to take manual control of steering the vehicle as at step 712. If the result of the inquiry at step 710 is false, the process proceeds to step 714 and auto-steering of the vehicle remains enabled.

Figure 8:
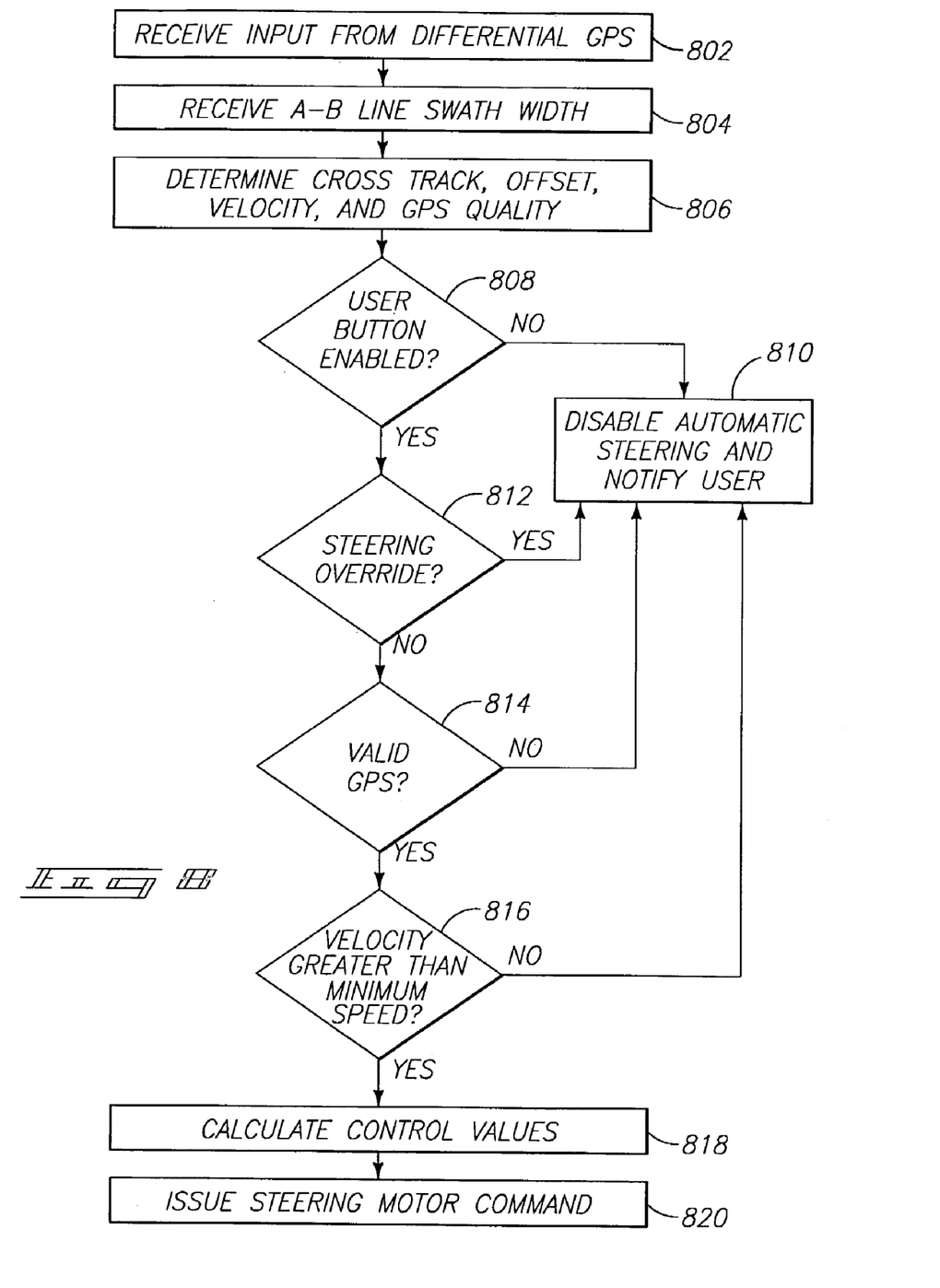
FIG. 8 is a detailed flow chart illustrating the steps involved in automatically performing parallel contour swathing in one embodiment.

FIG. 8 is detailed flow chart illustrating the steps involved in automatically performing parallel contour swathing in one embodiment of the present invention. At a step 802, the lightbar interface 104 receives input from the differential GPS. At a step 804, the lightbar interface 104 receives A-B line swath width from the user interface 108. Subsequently, at a step 806, cross track, offset, velocity, and GPS quality information is determined.

At a step 808, an inquiry is made to determine if the user had enabled a hardware switch to enable auto-steering of the vehicle. If false, the process proceeds to a step 810, disables automatic steering of the vehicle and notifies the user. Else, the process proceeds to a step 812 where an inquiry is made to determine if the user wishes to override auto-steering of the vehicle. If true, the process proceeds to step 810 as described above. Else, the process proceeds to step 814 to determine whether or not the GPS information received from the DGPS is valid. If the received GPS information is not valid, then the process loops to step 810. Else, the process proceeds to step 816 to determine if the vehicular velocity is greater than a predetermined minimum speed. If not true, then the process proceeds to step 810 to disable automatic steering and notifying the user. If the vehicular velocity is greater than a predetermined minimum speed, then the process proceeds to step 818.

At a step 818, control values are calculated in the master controller 110 to control the steering control system 114. At a step 820, steering motor commands are issued via a low-level controller to the steering control system 114 to automatically control vehicular steering.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A vehicular guidance method comprising:
providing a user interface using which data can be input to establish a contour for a vehicle to follow, the user interface further configured to receive information from a differential global positioning system (DGPS);
determining cross track and offset data using information from the DGPS, using a master controller;
generating control values, using at least vehicular kinematics, the cross track and the offset data; and
providing an output to control steering of the vehicle, using the control values, in a direction to follow the established contour while attempting to minimize the cross track and the offset data, by:
receiving control values from the master controller in a second controller;
configuring the second controller to interface with a steering control system; and
receiving steering commands from the second controller at the steering control system to steer the vehicle;
wherein, the second controller adjusts vehicular steering, and vehicular turn is computed using the equation:

vehicular turn=$R_k$*((cross track–$RG_1$)–(offset*$RG_2$))/velocity, where $R_k$, $RG_1$, and $RG_2$ are gains based upon velocity, cross track, and offset.

2. The method of claim 1 wherein, the output is configured to control a steering control system of the vehicle.

3. The method of claim 1 wherein, the output is configured to control a D.C. motor configured to be coupled to a steering mechanism of the vehicle.

4. The method of claim 1, further comprising:
sensing steering of the vehicle in a second controller; and
controlling the steering control system to attempt to minimize cross track and offset information.

5. The method of claim 4, further comprising:
determining if a counteracting force in excess of a predetermined threshold is applied to the steering control system and, if so,
disabling control of steering of the vehicle.

6. The method of claim 1 wherein, the automatically steering the vehicle is performed by:
receiving control values from the master controller in a second controller;
configuring the second controller to interface with the steering control system; and
receiving steering commands from the second controller at the steering control system to steer the vehicle.

7. A vehicle guidance system, comprising:
a computer system having a user interface, the computer system configured to receive data from a differential global positioning system (DGPS) and reference vehicular contour information from a user, the computer system further configured to generate cross track and offset data;
a control system configured to removably attach to a vehicle, the control system configured to receive at least vehicular velocity, the cross track and the offset data to generate commands to a steering control system to cause the steering control system to automatically steer the vehicle, to follow the reference vehicular contour, the control system including:
a master controller configured to receive the cross track, offset, and vehicular velocity data; and
a second controller configured to receive commands from the master controller, the second controller issuing commands to the steering control system to steer the vehicle to follow the reference vehicular contour; and
a steering control system comprising a D.C. motor system configured to be coupled to a steering column of the vehicle to retrofit the vehicle without tapping into hydraulic systems of the vehicle; and
wherein output of the D.C. motor is determined by the equation:

(Gain*(turn desired–Axle_POT)), where Axle_POT is read axle position.

8. A vehicular guidance method, comprising:
providing a user interface using which data can be input to establish a contour for a vehicle to follow, the user interface further configured to receive information from a differential global positioning system (DGPS);
determining cross track and offset data using information from the DGPS, using a master controller;
generating control values, using at least vehicular kinematics, the cross track and the offset data; and
providing an output to control steering of the vehicle, using the control values, in a direction to follow the established contour while attempting to minimize the cross track and the offset data, by:
receiving control values from the master controller in a second controller;
configuring the second controller to interface with a steering control system; and receiving steering commands from the second controller at the steering control system to steer the vehicle;

wherein vehicular turn is computed using the equation:

$$\text{vehicular turn} = R_k * ((\text{cross track} - RG_1) - (\text{offset} * RG_2))/\text{velocity},$$

where $R_k$, $RG_1$, and $RG_2$ are gains based upon velocity, cross track, and offset; and wherein desired turn of a vehicle is computed using the equation:

$$\text{turn desired} = (\text{vehicular turn} * \text{Axle\_AD} + \text{Axle\_mid}),$$

where

Axle_AD is a conversion; and

Axle_mid is calibrated value where the vehicle drives straight.

9. A vehicular guidance method comprising:

providing a user interface using which data can be input to establish a contour for a vehicle to follow, the user interface further configured to receive information from a differential global positioning system (DGPS);

determining cross track and offset data using information from the DGPS;

generating control values, using at least vehicular kinematics, the cross track and the offset data; and providing an output to control steering of the vehicle, using the control values, in a direction to follow the established contour while attempting to minimize the cross track and the offset data, the output being configured to control a D.C. motor configured to be coupled to a steering mechanism of the vehicle, wherein, output of the D.C. motor is provided by the equation:

$$(\text{Gain} * (\text{desired turn} - \text{Axle\_POT})),$$

where Axle_POT=read axle position.

10. A vehicular guidance method comprising:

providing a user interface using which data can be input to establish a contour for a vehicle to follow, the user interface further configured to receive information from a differential global positioning system (DGPS);

determining cross track and offset data using information from the DGPS, using a master controller;

generating control values, using at least vehicular kinematics, the cross track and the offset data; and providing an output to control steering of the vehicle, using the control values, in a direction to follow the established contour;

wherein the control values include vehicular turn, and wherein vehicular turn is computed using the equation:

$$\text{vehicular turn} = R_k * ((\text{cross track} - RG_1) - (\text{offset} * RG_2))/\text{velocity},$$

where $R_k$, $RG_1$, and $RG_2$ are gains based upon velocity, cross track, and offset.

11. The method of claim 10 wherein, the output is configured to control a steering control system of the vehicle.

12. A vehicular guidance system configured to removably attach to a vehicle, comprising:

a user interface configured to establish a contour for a vehicle to follow, the user interface further configured to receive information from a differential global positioning system (DGPS);

a computer system configured to receive input from the user interface to generate cross track and offset data;

a master controller configured to generate control values, including vehicular turn, using at least the cross track and the offset data, in order to control the vehicle to follow the established contour; and a second controller configured to interface with the master controller and a steering control system and receiving commands therefrom to control the steering control system in order to control steering of the vehicle, to follow the established contour while attempting to minimize the cross track and offset data, wherein, vehicular turn is computed using the equation:

$$\text{vehicular turn} = R_k * ((\text{cross track} - RG_1) - (\text{offset} * RG_2))/\text{velocity},$$

where $R_k$, $RG_1$, and $RG_2$ are gains based upon velocity, cross track, and offset.

13. The system of claim 12 wherein, a desired turn of a vehicle is computed using the equation:

$$\text{desired turn} = (\text{vehicular turn} * \text{Axle\_AD} + \text{Axle\_mid}),$$

where

Axle_AD is a conversion constant;

Axle_mid=calibrated value where the vehicle drives straight.

14. The system of claim 12 wherein, output of the D.C. motor is determined by the equation:

$$(\text{Gain} * (\text{turn desired} - \text{Axle\_POT})),$$

where Axle_POT=read axle position.

15. The method of claim 10 wherein, the output is configured to control a D.C. motor configured to be coupled to a steering mechanism of the vehicle.

16. The method of claim 10, further comprising:

sensing steering of the vehicle in a second controller; and controlling the steering control system.

17. The method of claim 16, further comprising:

determining if a counteracting force in excess of a predetermined threshold is applied to the steering control system and, if so, disabling control of steering of the vehicle.

18. A vehicle guidance system, comprising:

a computer system having a user interface, the computer system configured to receive data from a differential global positioning system (DGPS) and reference vehicular contour information from a user, the computer system further configured to generate cross track and offset data; and a control system configured to removably attach to a vehicle, the control system being configured to receive at least vehicular velocity, the cross track and the offset data to generate commands, including vehicular turn, to a steering control system to automatically steer the vehicle, to follow the reference vehicular contour, the control system further including:

a master controller configured to receive the cross track, offset, and vehicular velocity data; and a second controller configured to receive commands from the master controller, the second controller issuing commands to the steering control system to steer the vehicle to follow the reference vehicular contour;

wherein, vehicular turn is computed using the equation:

$$\text{vehicular turn} = R_k * ((\text{cross track} - RG_1) - (\text{offset} * RG_2))/\text{velocity},$$

where $R_k$, $RG_1$, and $RG_2$ are gains based upon velocity, cross track, and offset.

19. The system of claim 18 wherein a desired turn of a vehicle is computed using the equation:

$$\text{turn desired} = (\text{vehicular turn} * \text{Axle\_AD} + \text{Axle\_mid}),$$

where

Axle_AD is a conversion constant;
Axle_mid=calibrated value where the vehicle drives straight.

20. The system of claim 18 wherein, the master controller causes the vehicle to achieve speeds in excess of 15 mph.

21. The system of claim 18 wherein, the user interface enables a user to select vehicular contour parameters as well as monitor overall progress of the system.

22. The system of claim 18 wherein, the master controller issues commands to dynamically correct cross track and offset errors based on vehicular kinematics.

* * * * *